United States Patent
Dal-Santo et al.

(10) Patent No.: US 6,782,535 B1
(45) Date of Patent: Aug. 24, 2004

(54) DYNAMIC QUEUE WIDTH SYSTEM AND METHOD

(75) Inventors: Robert Dal-Santo, North Vancouver (CA); Lawrence H. Croft, Burnaby (CA)

(73) Assignee: Creo Inc., Burnaby (CA)

( * ) Notice: Subject to any disclaimer, the term of this patent is extended or adjusted under 35 U.S.C. 154(b) by 710 days.

(21) Appl. No.: 09/651,767

(22) Filed: Aug. 30, 2000

Related U.S. Application Data (60) Provisional application No. 60/151,502, filed on Aug. 30, 1999.

(51) Int. Cl.[7] ................................................. G06F 9/46
(52) U.S. Cl. ........................... 718/102; 718/102; 710/54
(58) Field of Search .......................... 358/1.15; 710/39, 710/100; 370/352; 713/1; 709/226

(56) References Cited

U.S. PATENT DOCUMENTS

| | | | | |
|---|---|---|---|---|
| 6,339,801 B1 | * | 1/2002 | Hefferon et al. | 710/39 |
| 6,373,585 B1 | * | 4/2002 | Mastie et al. | 358/1.15 |
| 6,640,300 B1 | * | 10/2003 | Raza | 713/1 |
| 6,680,933 B1 | * | 1/2004 | Cheesman et al. | 370/352 |

* cited by examiner

*Primary Examiner*—John Follansbee
*Assistant Examiner*—Dustin Nguyen
(74) *Attorney, Agent, or Firm*—Oyen Wiggs Green & Mutala (57) ABSTRACT

The present invention provides a distributed computing system and method for efficiently utilizing system resources with a variable width queue to handle resource contention. The present invention varies the width of the queue of active tasks such that as a resource becomes idle, a new tasks is added to the queue thereby incrementing the width of the queue and fully utilizing system resources.

19 Claims, 7 Drawing Sheets

DYNAMIC QUEUE WIDTH SYSTEM AND METHOD

RELATIONSHIP TO OTHER APPLICATIONS

This application claims the benefit under 35 U.S.C. § 119(e) of U.S. Provisional Patent Application No. 60/151,502, entitled DYNAMIC QUEUE WIDTH ADJUSTMENT TO OPTIMIZE SYSTEM THROUGHPUT filed Aug. 30, 1999, the subject of which is specifically incorporated herein by reference.

FIELD OF THE INVENTION

This invention relates generally to a distributed resource utilization system with a plurality of resource processing subsystems and, more particularly, to an optimized workflow system which efficiently allocates resources through the use of a variable width queue to manage resource allocation for the various resource processing subsystems.

BACKGROUND OF THE INVENTION

In accordance with a standard model of distributed resource utilization systems, a job is developed at a client and delivered to a resource device, by way of a server, for the purpose of executing the job. One exemplary model of a distributed resource utilization system is a network-printing environment. One such network-printing environment suited for the present invention is the ADOBE® EXTREME™ ("Extreme") network-printing environment from Adobe Systems Incorporated of San Jose, Calif.

Extreme is composed of a set of process modules and a communication framework for queuing these process modules and automating/coordinating the transfer of data from process module to process module. Extreme process modules are known as Job Ticket Processors ("JTP"). JTPs get information from a Job Ticket, which is an extended set of processing information about a Portable Document Format ("PDF") document written in Portable Job Ticket Format ("PJTF"), which is based on the PDF language. A PDF document and its associated Job Ticket contain essentially all the information (content, graphics, production specs, etc.) required for viewing processing and outputting a file in a self-contained package. Because a PDF document contains this important information, it can be thought of as a Digital Master, i.e., a complete and reliable description of a file's content and processing requirements.

PJTF extends the finctionality of PDF by carrying history, instructions and process control about both the content and the document itself. A Job Ticket collects information about the state of the document and what needs to happen to it. A Job Ticket may be included in a PDF document or exist as a separate entity. Thus, a Job Ticket is an independent part of a PDF document, and by separating the processing information from the content, a Job Ticket becomes an unambiguous job process management tool. The Job Ticket knows what needs to be done, and the Job Ticket Processor knows how to do it. One important benefit to this structure is that Portable Job Ticket Format and Job Ticket Processors can both be independently extended as new processing technology evolves and as business markets expand.

The JTP is the smallest working unit in the Extreme architecture. When components are added or removed from an Extreme system, they are in the form of a JTP. JTPs provide independent functionality. There are different types of JTPs that are called into play by the specifications contained in the Job Ticket. Modular Job Ticket Processors provide a way to "mix-and-match" required steps from an inventory of functionality. For example, a trapping engine (mechanism) is a JTP, imposition is effected by a JTP and even output is handled by an output JTP. In Extreme, JTPs can be sequenced flexibly so that if different jobs require different manufacturing plans, the same system can be used to structure the required processing sequences. The most important JTPs are the Sequencer, Coordinator, Normalizer, and Renderer (or printer JTP). Together, these JTPs form the key pieces of the Extreme architecture.

As a PDF document is built and moves through its required processes, information about these processes can be specified and collected in its Job Ticket. The Job Ticket can be examined, edited and enhanced. In an Extreme environment, the Job Ticket Processors can act on this information and, in turn, pass these specifications (or new specifications) over to other Job Ticket Processors. A Job Ticket is also an audit trail of what has happened along the way, and it is possible to use this information to configure JTPs for following steps.

Underneath it all, the communication framework of Extreme uses a coordinator, which sends information to and receives information from the JTPs. The coordinator determines which Job Ticket Processors are required and passes instructions between JTPs. The coordinator contains a Sequencer that defines the internal Extreme workflow. The Sequencer reads information from Job Tickets, sets up a JTP sequence, makes process choices, and then updates Job Tickets as information is returned from each JTP. Thus rather than being a hard-wired flowchart of steps, the process itself becomes much more flexible and responsive to the real-time results of the processing.

One shortcoming of previous systems, including the Extreme system, is that each resource has its own queue of unprocessed tasks while it is busy processing a current task. This means that interchangeable resources may be under/over utilized depending on how tasks are allocated to the resource(s) and how quickly or slowly each resource finishes each task. Therefore, there is a need for a resource contention management and optimization method and system wherein resources are more efficiently utilized. Preferably, such a system would be able to be integrated into any existing system with minimal impact to either cost or performance. Furthermore, it is desirable that tasks requiring multiple resources be able to proceed more quickly. Therefore, a method and system are desired that allows concurrent use of resources by a single task. Finally, there is a need for a resource contention management method and optimization system wherein tasks are assigned to resources based on the priority of the task.

SUMMARY OF THE INVENTION

The present invention provides a distributed computing system and method wherein resources are efficiently allocated. Resource allocation begins after retrieving a task from a task queue and adding the task to a variable width queue. The task is then examined to determine what resource or resources it requires. The required resources are then examined to determine if they are available. If any required resource is available, then it is allocated to the task. The required resources are then repeatedly checked until all have been assigned to the task that needs them.

In accordance with one aspect of the present invention, the tasks in the task queue may be rearranged according to a predetermined order, such as by priority or by size. In accordance with another aspect of the current invention, when allocating a resource to a task, the status of the resource is changed from "unallocated" to "allocatedd", which in turn allows a resource subsystem in accordance with the present invention to determine if a resource is available or not by examining its allocation status.

In yet another aspect of the current invention, when a task no longer requires a resource and deallocates it, the deallocated resource changes its status to "unallocated". Which, when any task has changed all its required resource or resources to "unallocated", lets the resource subsystem remove the task from the variable, width queue.

The approach of the current invention is flexible and may be used in any number of distributed printing environments having a need for load balancing in a prioritized, flexible and efficient manner. Additionally, the current invention may be applied more generally to data processing environments where task turn around time and overall system throughput may be positively affected by granting more resources to tasks that can concurrently use them and keep resources from laying idle.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a system and method for efficiently allocating resources that use a variable width queue to manage resource allocation for various resourced processing subsystems. The present invention utilizes a variable width queue to handle resource contention issues arising in a computing environment. The present invention does not handle resource requests in a pure serial manner such that any one task may only allocate a single resource at any one time. Additionally, the present invention does not require a single or a fixed width queue (determined by the number of resources) for all resources such that tasks that only allocate a portion of the resources would leave the other resources idle. Instead, the present invention varies the width of a queue of active tasks such that as a resource becomes idle (the former task would also be removed if it has finished using all other resources), a new task is added to the queue thereby incrementing the width of the queue and fully utilizing all resources.

Figure 1:
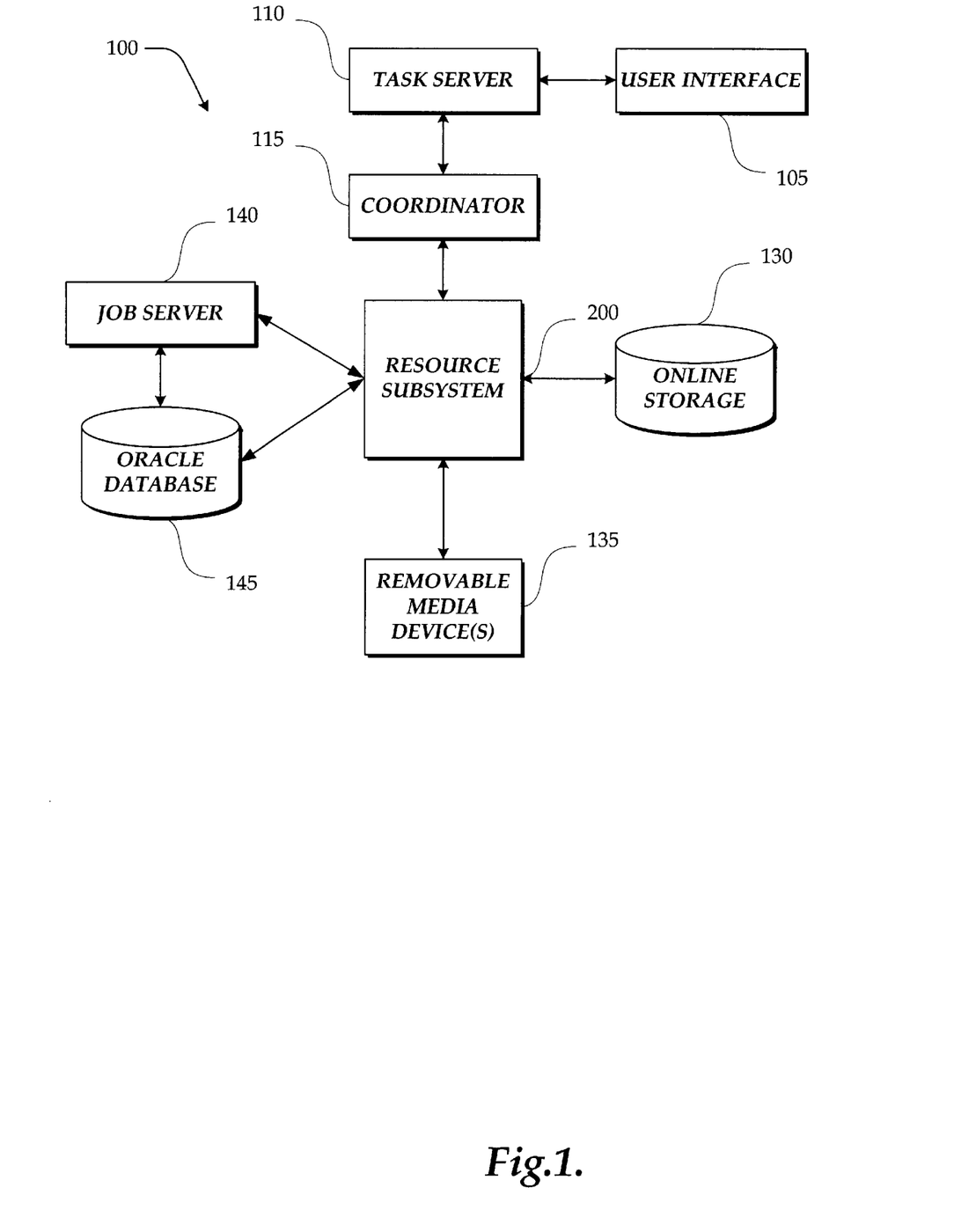
FIG. 1 is a block diagram of a distributed resource utilization system which utilizes the present invention.

FIG. 1 is a block diagram depicting distributed resource utilization system 100 that utilizes the present invention. In one actual embodiment of the present invention, the system 100 obtains instruction from a user interface subsystem 105 that communicates with a task server 110 to manage the creation and distribution of tasks within the system 100. Distribution is further handled by a coordinator 115. One exemplary subsystem adapted for use by the present invention is the resource subsystem 200, which is discussed in more detail below. The resource subsystem interacts with the other components of the system 100 to receive requests for resources and to manage the resource requests and the necessary resource devices such as one or more removable media device(s) 135. The resource system may also manage remote systems such as online storage 130. The resource requests are tracked using the task server 110 and a job server 140 which provides and stores meta data associated with resource activities active in the resource subsystem 200. In one actual embodiment, the job server is also in communication with an ORACLE® database 145 that it uses to store the meta data.

The user interface subsystem 105, the task server 110, the coordinator 115 and the resource subsystem 200 all may exist as separate physical devices, however, it will be apparent to those of ordinary skill in the art that one or more of the user interface subsystem 105, the task server 110, the coordinator 115 and the resource subsystems 200 may be combined in the same device(s). It will also be appreciated by those of ordinary skill in the art that multiple devices may provide the same functionality and capabilities as any one of the user interface subsystem 105, the task server 110, the coordinator 115 and the resource subsystem 200.

Figure 2:
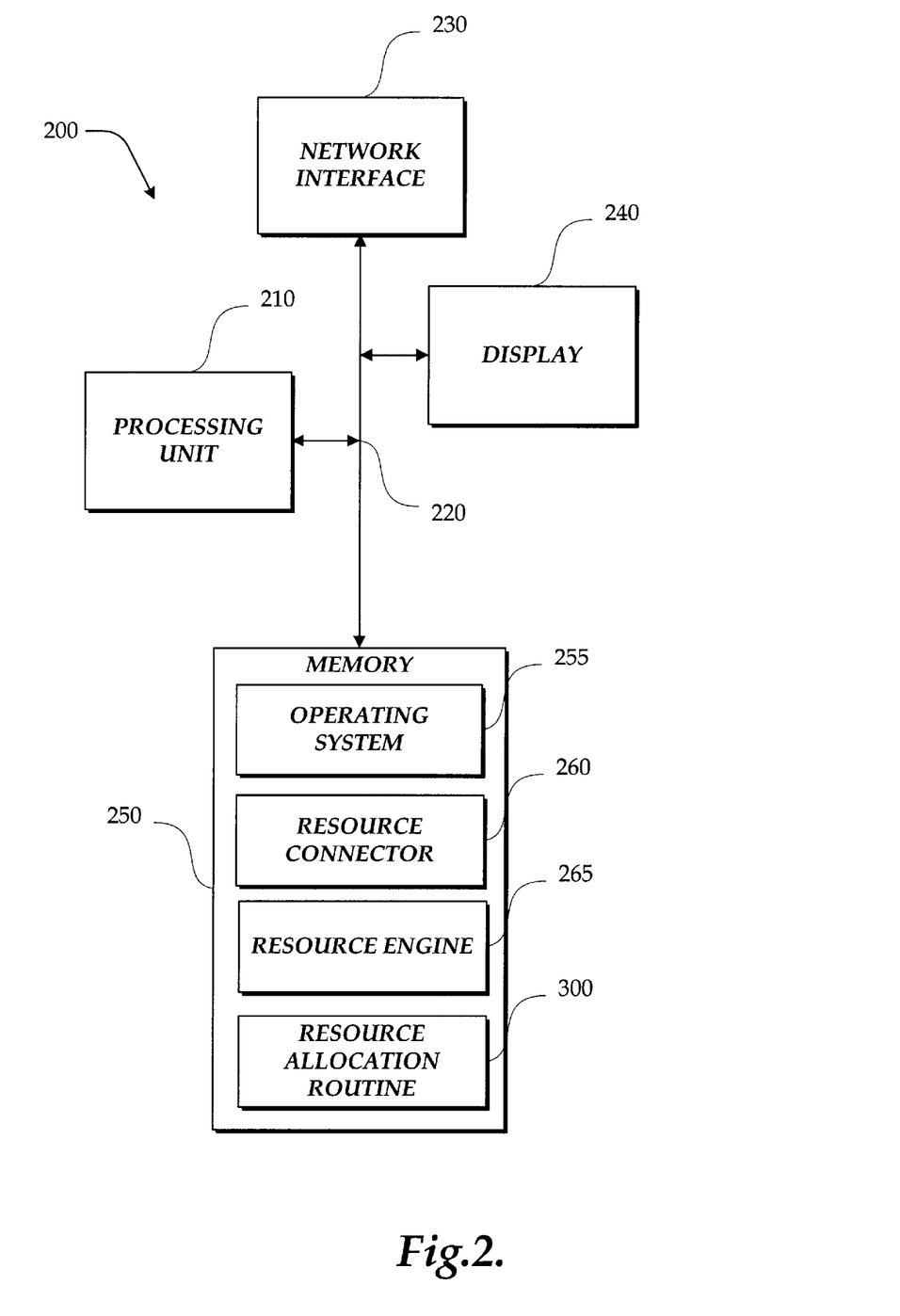
FIG. 2 is a block diagram illustrating several of the components of a resource subsystem used to allocate resources using a variable width queue in accordance with the present invention.

FIG. 2 depicts several of the key components of an exemplary resource subsystem 200. Those of ordinary skill in the art will appreciate that the resource subsystem 200 may include many more components then those shown in FIG. 2. However, it is not necessary that all of these generally conventional components be shown in order to disclose an illustrative embodiment for practicing the present invention. As shown in FIG. 2, the resource subsystem 200 includes a network interface 230 for connecting to the system 100. Those of ordinary skill in the art will appreciate that the network interface 230 includes the necessary circuitry for such a connection.

The resource subsystem 200 also includes a processing unit 210, a display 240, and a memory 250 all interconnected along with the network interface 230 via a bus 220. The memory 250 generally comprises a random access memory, (RAM), a read-only memory (ROM) and a permanent mass storage device, such as a disk drive. The memory 250 stores the program code necessary for entering and transmitting a message over the system 100 in accordance with the present invention. More specifically, the memory 250 stores a resource connector 260 for receiving resource requests, a resource engine 265 for managing the resource requests and the necessary resource devices used in accordance with the present invention and a resource allocation routine 300 which is described in more detail below. In addition, memory 250 also stores an operating system 255. It will be appreciated that these software components may be stored on a computer-readable medium and loaded into memory 250 of the resource subsystem 200 using a drive mechanism associated with the computer-readable medium, such as a floppy, tape or DVD/CD-ROM drive.

Although an exemplary resource subsystem 200 has been described that generally conforms to a conventional general purpose computing device, those of ordinary skill in the art will appreciate that a resource subsystem 200 may be any of a great number of devices capable of communicating with the system 100. Additionally, the resource subsystem 200 may be included in other components of the system 100, such as in the task server 110 or coordinator device 115.

Figure 3:
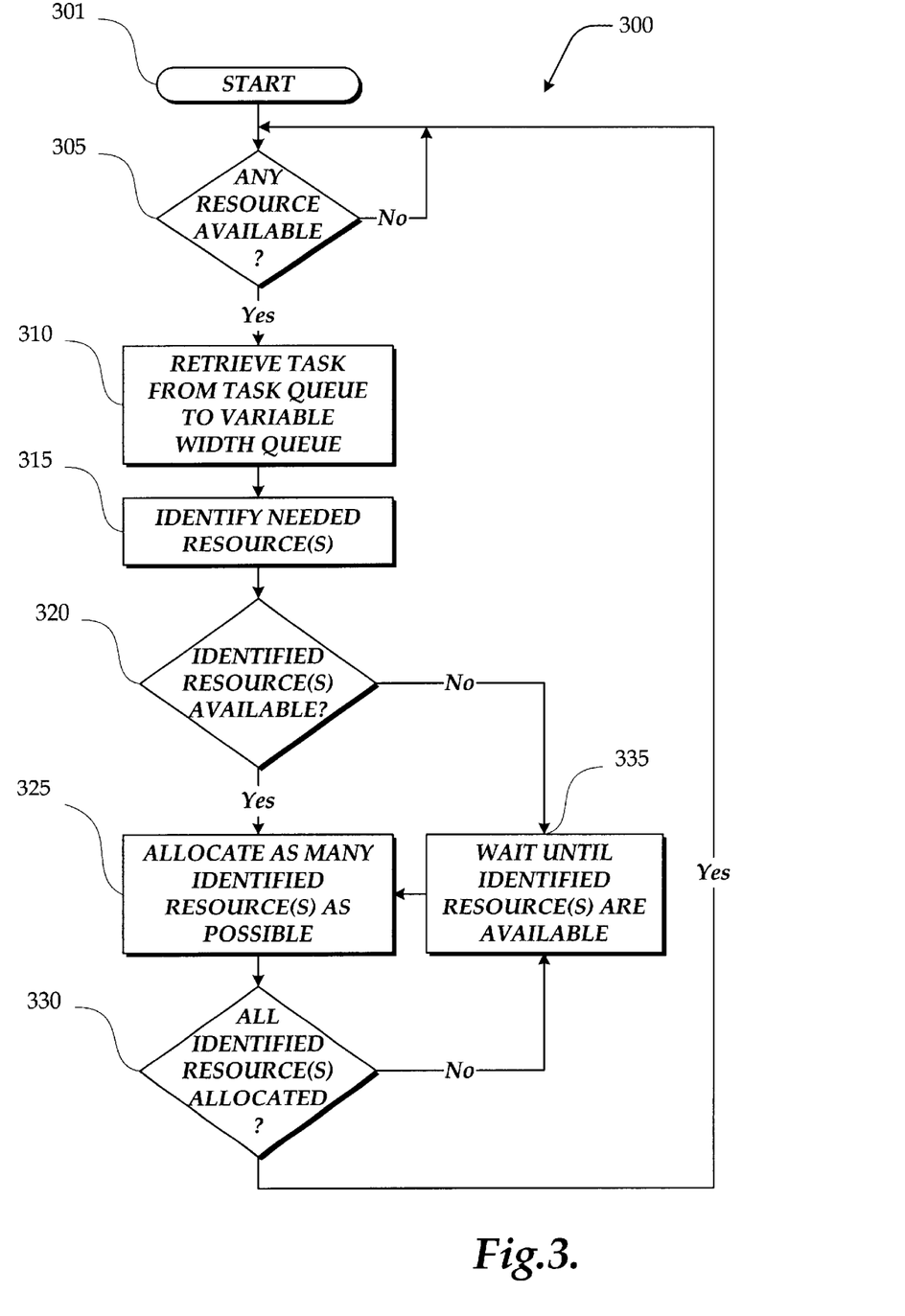
FIG. 3 is a flow diagram illustrating the logic used by the resource subsystem when allocating queue width and resources.

FIG. 3 is a flow chart illustrating the logic implemented by an exemplary allocation routine 300 in the resource subsystem 200 to allocate resources to tasks as they are desired. The logic begins in block 301 and proceeds to decision block 305, where a check is made whether any resources are available. If no resources are available, then routine 300 loops back to decision block 305 until one becomes available. Once a resource becomes available then routine 300 continues to block 310.

At block 310, routine 300 retrieves a task 405 from a task queue 505 and adds the task to a variable width queue 510 by processing the task 405 through the coordinator 115 and the resource subsystem 200. The task queue 505 of the current invention generally operates as a standard first-in-first-out (FIFO) queue, however, as inactive tasks in the task queue 505 may have varying priorities, it is contemplated, that in some circumstances, the order of the tasks may be rearranged based on priority requirements. It will be appreciated by those of ordinary skill in the art, that by moving the higher priority tasks to the head of the task queue 505, they will be allocated resources sooner than other lower priority task. It will also be appreciated that the tasks may be arranged in any predetermined order as required by the system for more efficient processing. For example, certain tasks may require the same resource and it would enhance throughput if each task requiring the same resource was processed one after the other. Those of ordinary skill in the art will appreciate that other predetermined order may benefit different systems 100 as well.

At block 315, routine 300 determines which resource(s) the task 405 needs. Although some resources 410 are interchangeable, such as removable tape drives or identical, laser printers, others may not be interchangeable, such as color ink jet printers and monochrome laser,printers or different hard drive holding difference information. Accordingly, in decision block 320, routine 300 determines if the particular resource(s) 410 needed by the task 405 are available. If the resource(s) 410 are available, then in block 325 the identified resource(s) are allocated to the task 405 and each allocated resource 410 is updated to indicate that it is no longer available. Routine 300 then proceeds to decision block 330 where a determination is made whether all identified resource(s) 410 have been allocated to the task 405, if not, then routine 300 continues to block 335 as discussed below. Otherwise, routine 300 begins another iteration and proceeds back to decision block 305.

If at decisions block 320 or decision block 330, a "no" decision is determined, then routine 300 continues to block 335 and waits until the identified resource(s) 410 become available and then continues processing at block 325 as discussed above.

Figure 4:
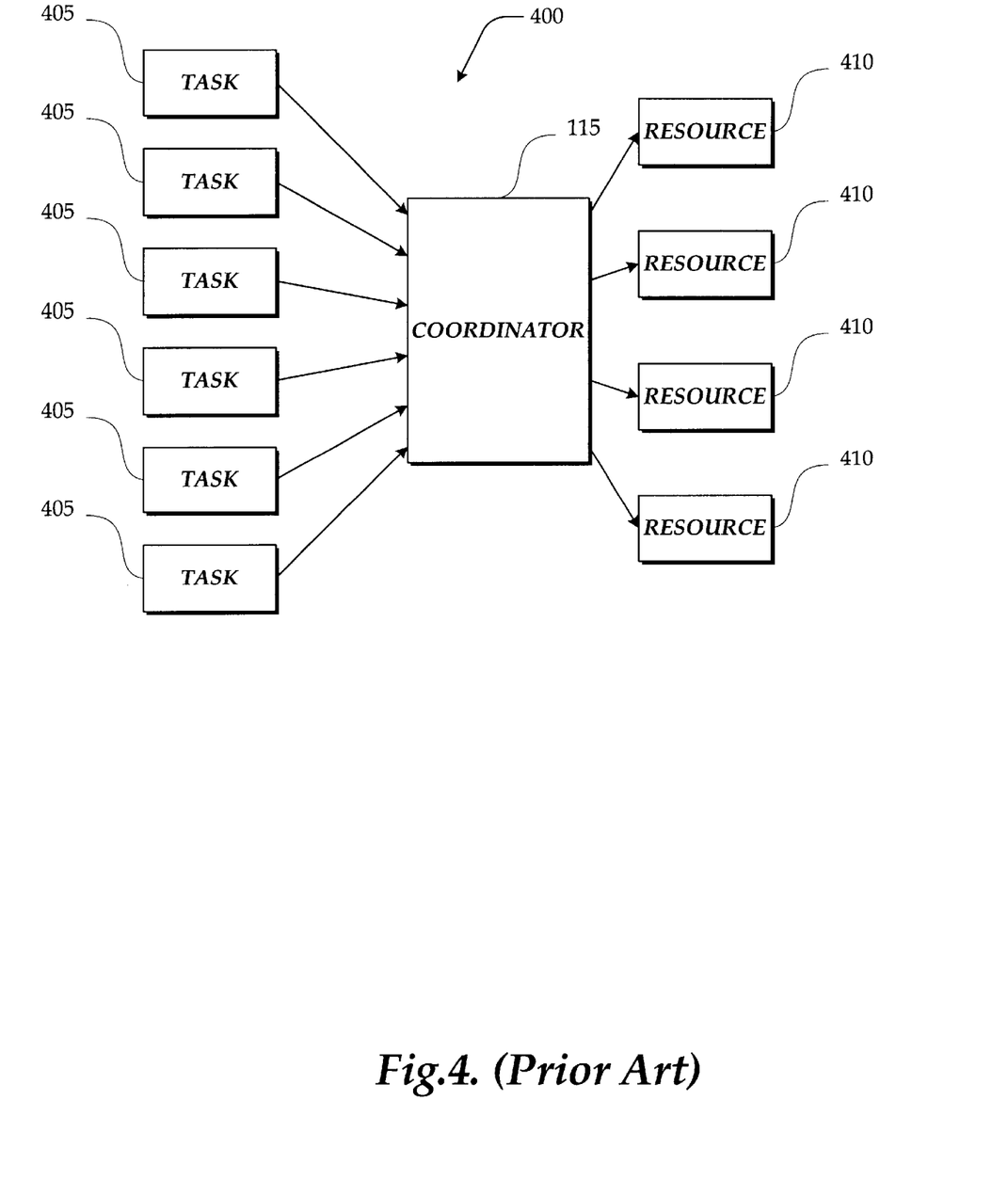
FIG. 4 (prior art) is a block diagram illustrating the manner in which tasks (job tickets) and resources are allocated using methods known to those of ordinary skill in the art.

As discussed above with regard to routine 300, FIG. 4 is a simplified diagram of prior art resource allocation system 400 with tasks 405 and resources 410 under the direction of the coordinator 115. The system 400 does not have a resource subsystem 200 as in the present invention that would allow it to overcome the resource contention problems the present invention solves.

Figure 5:
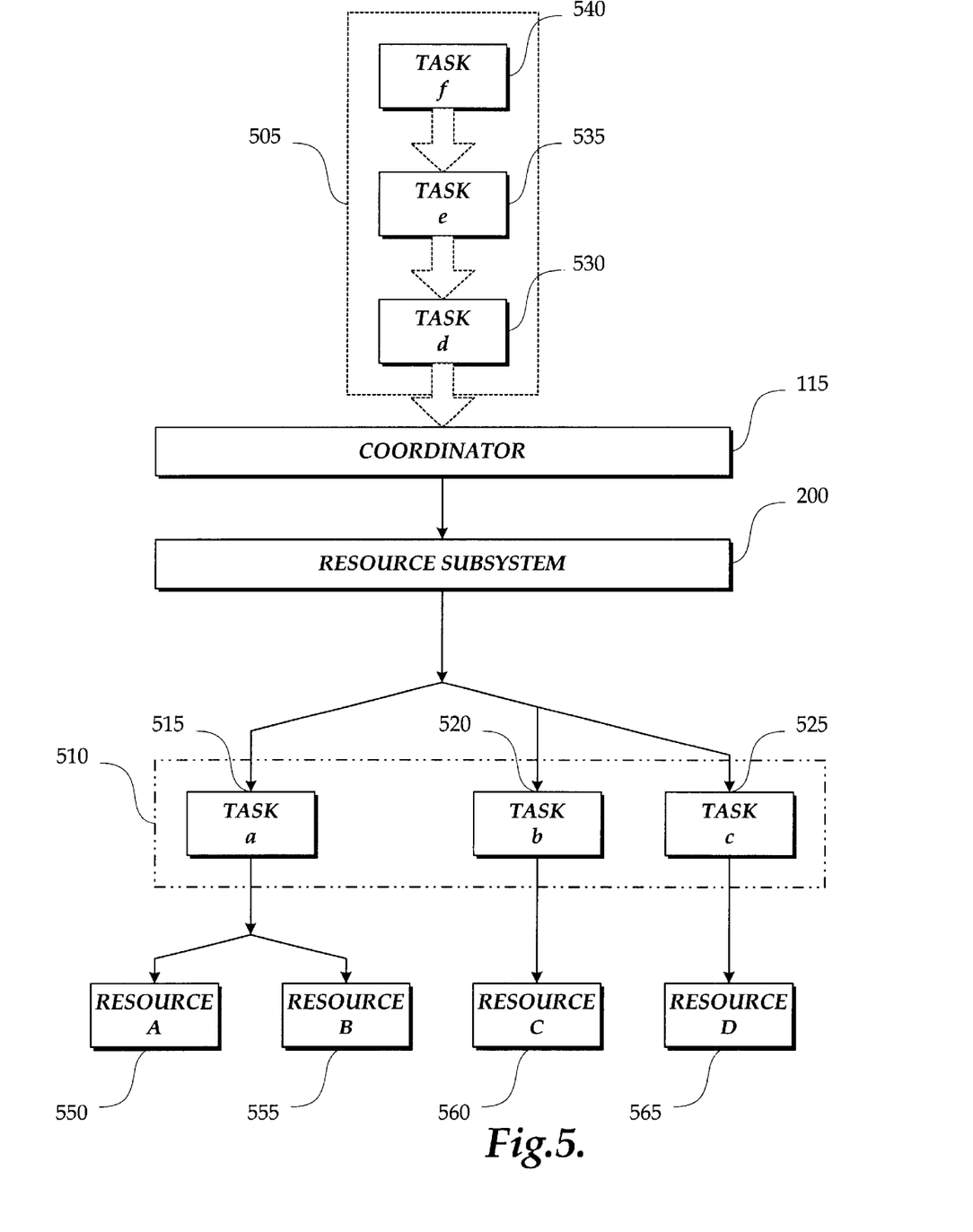
FIGS. 5–7 are a series of block diagrams illustrating the manner in which tasks and resources are allocated in accordance with the present invention.
Figure 6:
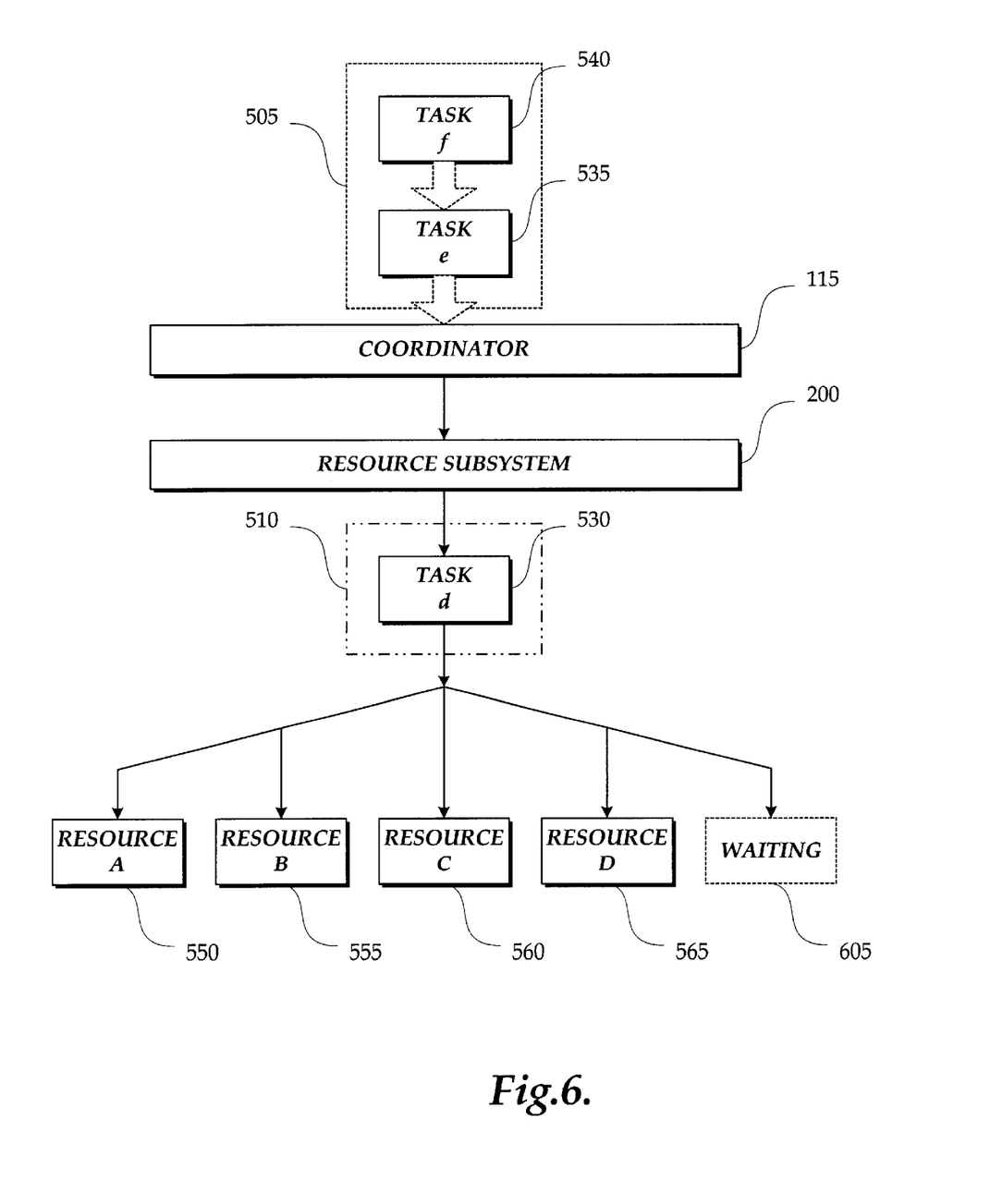
Figure 7:
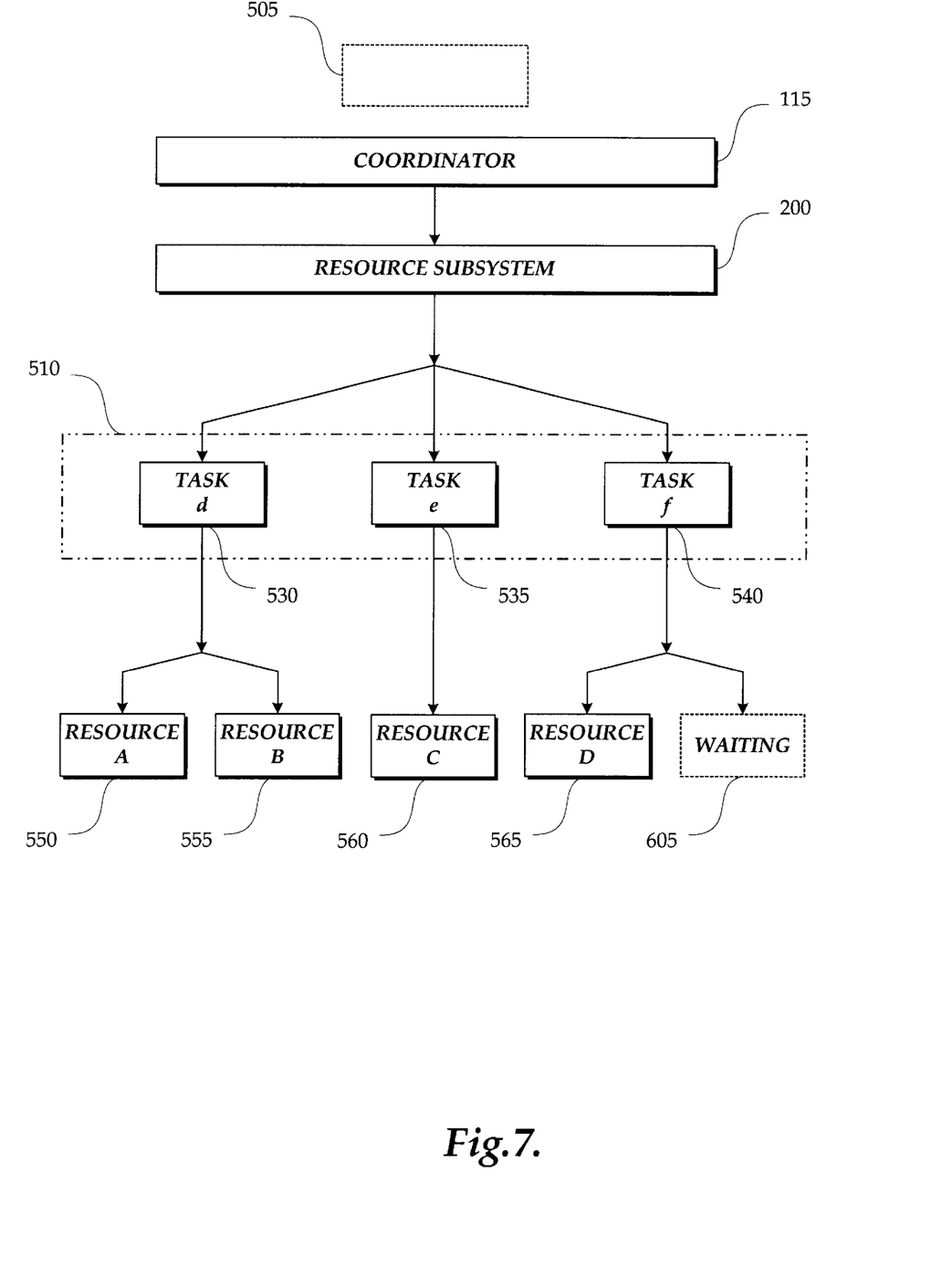

FIGS. 5–7 are a series of figures showing "time-slices" of the coordinator 115 and resource subsystem 200 allocating resources 410 to tasks 405 in accordance with the present invention. In FIG. 5, a task queue 505 holds three inactive tasks 405 (task d 530, task e 535 and task f 550), waiting to be directed by the coordinator 115 and resource subsystem 200 to resources 410 Meanwhile, the coordinator 115 and resource subsystem 200 have already directed three active tasks (task a 515, task b 520 and task c 525) into a variable width queue 510. As can be seen in FIG. 5, the "width" of the queue is three, there are three tasks that are active, using resources 410 (resource A 550, resource B 550, resource C 560 and resource D 565) in the variable width queue 510. Note that task a 515 has allocated both resource A 550 and resource B 555.

Comparing FIG. 5 to FIG. 6 we see that task a 515, task b 520 and task c 525 have completed their processing using resource A 550, resource B 550, resource C 560 and resource D 565. Now, in FIG. 6, the task queue 505 holds two inactive tasks 405 (task e 535 and task f 550), waiting to be directed by the coordinator 115 and resource subsystem 200 to resources 410. Meanwhile, the coordinator 115 and resource subsystem 200 have directed task d 530 into the variable width queue 510. Now the width of the queue has shrunk to only one as task d 530 is using all the resources (resource A 550, resource B 550, resource C 560 and resource D 565) in the variable width queue 510. Note that all the resources have been allocated to task d 530 which is still waiting for another resource as indicated by the "waiting resource block" 605.

Comparing FIG. 6 to FIG. 7 we see that task d 530 has completed its processing using resource C 560 and resource D 565, however task d 530 is still processing using resource A 550 and resource B 550. Now, in FIG. 7 the task queue 505 is empty with no inactive tasks 405 waiting to be directed by the coordinator 115 and resource subsystem 200 to resources 410. Meanwhile, the coordinator 115 and resource subsystem 200 have directed task e 535 and task f 540 into the variable width queue 510. Now that the width of the queue has grown to three, task d 530, task e 535 and task f 540 are all active using resource A 550, resource B 550, resource C 560 and resource D 565 in the variable width queue 510. Note that resource D 565 has been allocated to task f 540 which is still waiting for another resource as indicated by the "waiting resource block" 605.

While the preferred embodiment of the invention has been illustrated and described, it will be appreciated that various changes can be made therein without departing from the spirit and scope of the invention. In particular, although the exemplary embodiment of the present invention discussed in detail above relates to an archiving system, the present invention could be applied to any computing environment in which limited resources are in contention.

The embodiments of the invention in which an exclusive property or privilege is claimed are defined as follows:

1. A method of allocating resources to tasks utilizing a variable width queue, the method comprising:
   retrieving a task from a task queue;
   enqueuing said task to said variable width queue, thereby incrementing a width of said variable width queue;
   identifying a plurality of resource requirements for said task, said resource requirements including requirements for at least two resources which are not interchangeable;
   determining if any resource corresponding to said plurality of resource requirements is available;
   allocating any available resource corresponding to said plurality of resource requirements to said task;
   repeatedly determining if any additional resource corresponding to said plurality of resource requirements can be allocated to said task, and, if so, allocating said additional resource to said task until resources corresponding to all said plurality of resource requirements have been allocated to said task.

2. The method of claim 1, wherein said tasks in said task queue are arranged in a predetermined order.

3. The method of claim 1, wherein allocating any available resource further comprises changing a state of said allocated resource to indicate that it is allocated.

4. The method of claim 1, wherein identifying said plurality of resource requirements for said task comprises examining said task to determine a plurality of types of resource needed by the task and matching all resources of said resource types.

5. The method of claim 4, wherein determining if any resource corresponding to said plurality of resource requirements is available comprises examining a state of said matched resources to determine if any resource of said matched resources is not allocated.

6. The method of claim 1, wherein said task is described by a job ticket.

7. The method of claim 1, wherein said allocated resource is a removable media device.

8. The method of claim 1 comprising deallocating a resource previously allocated to a task when, said task no longer requires the resource.

9. The method of claim 8, wherein said task having deallocated said resource, also removes any corresponding at least one resource requirement.

10. The method of claim 9, wherein said task no longer has any at least one resource requirement, further comprising dequeuing said task from said variable width queue, thereby decrementing said width of said variable width queue.

11. A computer-readable medium having a computer executable component for performing the method recited in any of claims 1–10.

12. A system for allocating resources utilizing a variable queue width, the system comprising:
   a plurality of resources at least some of the resources being non-interchangeable;
   a variable width queue;
   a task server having a task queue and operative to deliver tasks to a coordinator;
   wherein said coordinator is operative to:
      retrieve a task from a task queue;
      identify at least one resource requirement for said task;
      where said task has a plurality of resource requirements and said resource requirements include requirements for at least two resources which are not interchangeable, determine if any resource corresponding to said plurality of resource requirements is available;
      enqueue said task to said variable width queue, thereby incrementing a width of said variable width queue;
      allocate to the task any available resource corresponding to said plurality of resource requirements; and
      repeatedly determine if any additional resource corresponding to said plurality of resource requirements can be allocated, and, if so, allocating said additional resource to said task until resources corresponding to all said plurality of resource requirements have been allocated to said task.

13. The system of claim 12, wherein said coordinator is an ADOBE EXTREME coordinator.

14. The system of claim 12, wherein said tasks in said task queue are arranged in a predetermined order.

15. The system of claim 12, wherein said task is described by a job ticket.

16. The system of claim 12, wherein said task is processed by a job ticket processor.

17. The system of claim 12, wherein said resource corresponding to said at least one resource requirement is a removable media device.

18. The system of claim 12, wherein said task no longer requires some resource then deallocates the no longer required resource and removes any corresponding at least one resource requirement.

19. The system of claim 18, wherein if said task no longer has any at least one resource requirement, said coordinator is further operative to dequeue said task from said variable width queue, thereby decrementing said width of said variable width queue.

* * * * *